(12) United States Patent
Hu et al.

(10) Patent No.: US 8,964,130 B2
(45) Date of Patent: Feb. 24, 2015

(54) ELECTRIC APPARATUS AND AN OPERATION METHOD THEREOF

(75) Inventors: Minna Hu, Qingdao (CN); Lianfa Gong, Qingdao (CN)

(73) Assignees: Hisense Group Co., Ltd., Qingdao (CN); Hisense Electric Co., Ltd., Qingdao (CN)

( * ) Notice: Subject to any disclaimer, the term of this patent is extended or adjusted under 35 U.S.C. 154(b) by 1361 days.

(21) Appl. No.: 12/073,081

(22) Filed: Feb. 29, 2008

(65) Prior Publication Data

US 2009/0002929 A1    Jan. 1, 2009

(30) Foreign Application Priority Data

Jun. 26, 2007    (CN) .......................... 2007 1 0016606

(51) Int. Cl.
  *H04N 9/31* (2006.01)
  *H04N 5/64* (2006.01)
(52) U.S. Cl.
  CPC ...................................... *H04N 5/64* (2013.01)
  USPC ............ 348/761; 348/760; 348/734; 348/751
(58) Field of Classification Search
  None
  See application file for complete search history.

(56) References Cited

U.S. PATENT DOCUMENTS

| | | | | |
|---|---|---|---|---|
| 6,532,152 | B1* | 3/2003 | White et al. | 361/692 |
| 2006/0097933 | A1* | 5/2006 | Lee | 343/702 |
| 2006/0170644 | A1* | 8/2006 | Ioki et al. | 345/102 |
| 2008/0316397 | A1* | 12/2008 | Polak et al. | 349/97 |
| 2009/0207318 | A1* | 8/2009 | Ma et al. | 348/734 |

FOREIGN PATENT DOCUMENTS

| | | |
|---|---|---|
| CN | 1111872 A | 11/1995 |
| CN | 1133919 A | 10/1996 |
| CN | 2829216 Y | 10/2006 |
| CN | 101064523 A | 10/2007 |
| JP | 10-58953 A | 3/1998 |
| WO | WO 2005/052774 A2 | 6/2005 |

* cited by examiner

*Primary Examiner* — Thanh-Nhan P Nguyen
(74) *Attorney, Agent, or Firm* — McDermott Will & Emery LLP

(57) ABSTRACT

The present invention discloses an electric apparatus and operation method thereof. The electric apparatus includes: display unit to display the output content from said electric apparatus; operation unit used to operate said electric apparatus; the apparatus further includes: the primary indication unit, when the primary indication unit is started up, the operation unit is in visible status and otherwise the operation unit is in invisible status. The design of the present invention improves the front visual effect and the interactive performance of the electrical apparatus.

11 Claims, 3 Drawing Sheets

The primary indication unit illuminates the operation unit 3 so that the operation unit is in visible status The primary indication unit illuminates the operation unit 3 so that the operation unit is in visible status When the primary indication unit is not started up, the operation unit 3 is in invisible status

ELECTRIC APPARATUS AND AN OPERATION METHOD THEREOF

TECHNICAL FIELD

The present invention relates to an electric apparatus, and more specifically to the hidden operation unit structure of the electric apparatus and the operation method thereof.

BACKGROUND

With the constant improvement of the consumption and appreciation levels, the appearance of the conventional electric apparatus can not meet the aesthetic requirement of the consumers.

Although more and more fashionable elements are introduced in the appearance design of home electric apparatus with the appearance of liquid crystal television, plasma TV, liquid crystal display, DVD with liquid crystal panel, and so on, and the auxiliary equipments of all kinds of electric apparatus gradually apply hidden design elements, the sound boxes, connection ports and remote controller are designed in the hidden part, or all function keys are designed to as touching-type, therefore, the appearance structure of the panel of the electric apparatus is simplified and the number of the unnecessary components displayed on the front of the electric apparatus is reduced.

At present, the key-presses of all kinds of home electric apparatus still can be directly seen at the obverse side. They manifest outside the frame at the obverse side, or the color of the case is designed not consistent with that of the panel, therefore, the position of the key-presses needed to be operated can be easily found and distinguished clearly when the operator wants to press the key-presses.

However, the above design has a problem, that is since the key-presses are exposed within the line of sight, it affects the visual impact of the appearance of the electric apparatus on the consumers, and especially for the electric apparatus which takes a long time to enjoy, the disadvantage of the exposed key-presses is evident, for example, for TV or computer screen, long time and short distance watching will make any obstacle on the front of the screen affect the line of sight.

CONTENT OF THE INVENTION

An object of the present invention is to offer an electric apparatus to improve visual effect, especially the visual effect of the appearance of the electric apparatus.

Another object of the present invention is to offer an electric apparatus with hidden key-presses design, which simplifies the panel of the electric apparatus and maximally reduces the impact on the line of sight.

Still another object of the present invention is to offer an electric apparatus with improved interactive performance.

In order to achieve the above objects, the present invention provides the following technical scheme:

An electric apparatus, which includes:

A display unit, used to display the output content from said electric apparatus;

An operation unit, used to operate said electric apparatus;

Which is characterized in that, the electric apparatus also includes:

When the primary indication unit is started up, the operation unit; is in visible status and otherwise the operation unit is in invisible status.

Preferably, said electric apparatus also includes:

The secondary indication unit, used to indicate the working condition of the electric apparatus;

The triggering unit, when triggered, said primary indication unit is started up, otherwise said primary indication unit is not started up;

Said secondary indication unit is the triggering unit.

Preferably, said secondary indication unit can be used as the triggering unit to control the condition of said primary indication unit when the power source of the electric apparatus is in working condition.

Preferably, said primary indication unit is LED, said LED is fixedly connected with said display module; said operation unit includes several touching-type key-presses.

Preferably, the number of said LEDs is the same as that of said touching-type key-presses and their mounting positions correspond to each other.

Preferably, said display unit is equipped with a translucent shell, and the color of said operation unit is similar to or the same as said translucent shell.

Preferably, said operation unit is located after of the said translucent shell, it is fixedly connected with said display unit.

Preferably, the light emitted from said primary indication unit is different from that the color of the translucent shell.

Preferably, both the translucent shell and the operation unit are black and light from the primary indication unit is blue.

Preferably, each indication time of said primary indication unit is determined.

In addition, the present invention further offers a operation method of an electric apparatus. The technical scheme is:

Said electric apparatus includes:

A display unit, used to display the output content from said electric apparatus;

An operation unit, used to operate said electric apparatus;

The primary indication unit;

The method includes the following steps: start up the primary indication unit, said operation unit is in visible status, said operation unit can be operated then; otherwise, said operation unit is in invisible status.

With the technical scheme offered in the present invention, the secondary operation unit is hidden and can not be observed within the line of sight when the electric apparatus is in the normal working condition and the powered off condition, and the secondary operation unit is only illumined by the triggering unit when the secondary operation unit is needed to adjust the electric apparatus, which maximizes the terseness of the appearance of the electric apparatus and increases the interaction between the consumers and the electric apparatus. And the present structure of the electric apparatus is further fully utilized through the integration of the secondary indication unit and the triggering unit.

THE PREFERRED EMBODIMENT OF THE PRESENT INVENTION

The electric apparatus offered in the present invention will be described in further detail with reference to the accompanying figures and the embodiments.

The present invention can be applied to a variety of electric apparatus such as CRT TV, LCD TV, plasma TV, LCD computer, display, DVD, and so on. Its effect is especially evident for TV and computer displays which take a long time for the eyes to enjoy the content of the screen. For description, the LCD TV will be used in the preferred embodiment of the present invention to describe the design and the implementation of the present invention, yet the present invention will not be limited to the application of the preferred embodiment.

Figure 1:
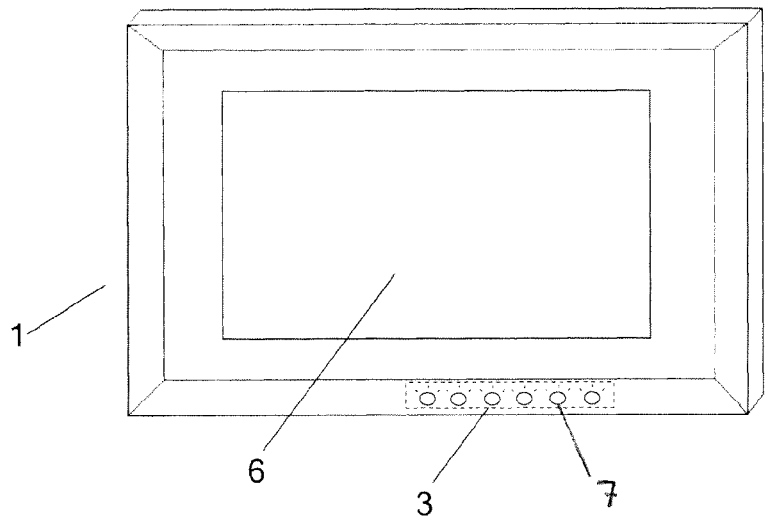
FIG. 1 is a localized effect view in accordance with the preferred embodiment of the present invention.
Figure 2:
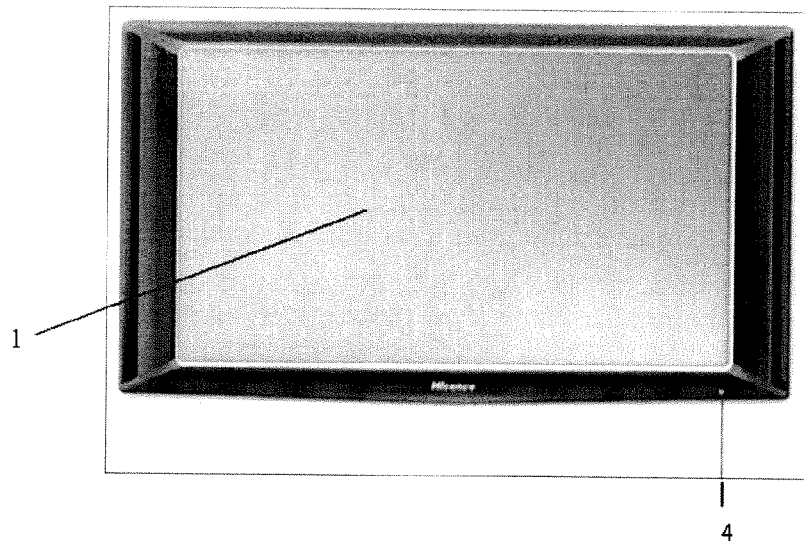
FIG. 2 is an illustration when the operation unit in FIG. 1 is in invisible status.
Figure 3:
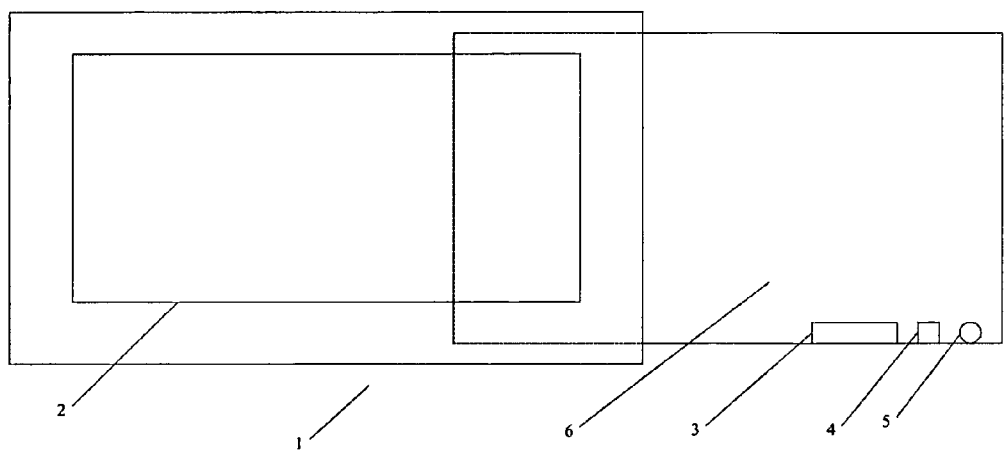
FIG. 3 is the structural diagram in accordance with the preferred embodiment of the present invention.

Refer to FIG. 1,2, and FIG. 3, the electric apparatus in the figures is LCD TV, wherein, 1 is LCD TV, 2 is the translucent shell, 3 is the operation unit, 4 is the secondary indication unit, 5 is the power supply ON/OFF device, and 6 is the display unit.

In this preferred embodiment, the display unit 6 is equipped with the operation unit 3, the secondary indication unit 4 and the power supply ON/OFF device 5, while the display unit 6, the translucent shell 2 and other components (such as sound boxes not shown in the figures) constitute the LCD TV 1.

Of course, the equipped positions of the power supply ON/OFF device 5, the secondary indication unit 4 and the operation unit 3 and the display unit 6 can be changed, wherein the translucent shell 2 is square, but it is not limited to this, and the display unit here is the LCD screen and the related fittings.

Figure 4:
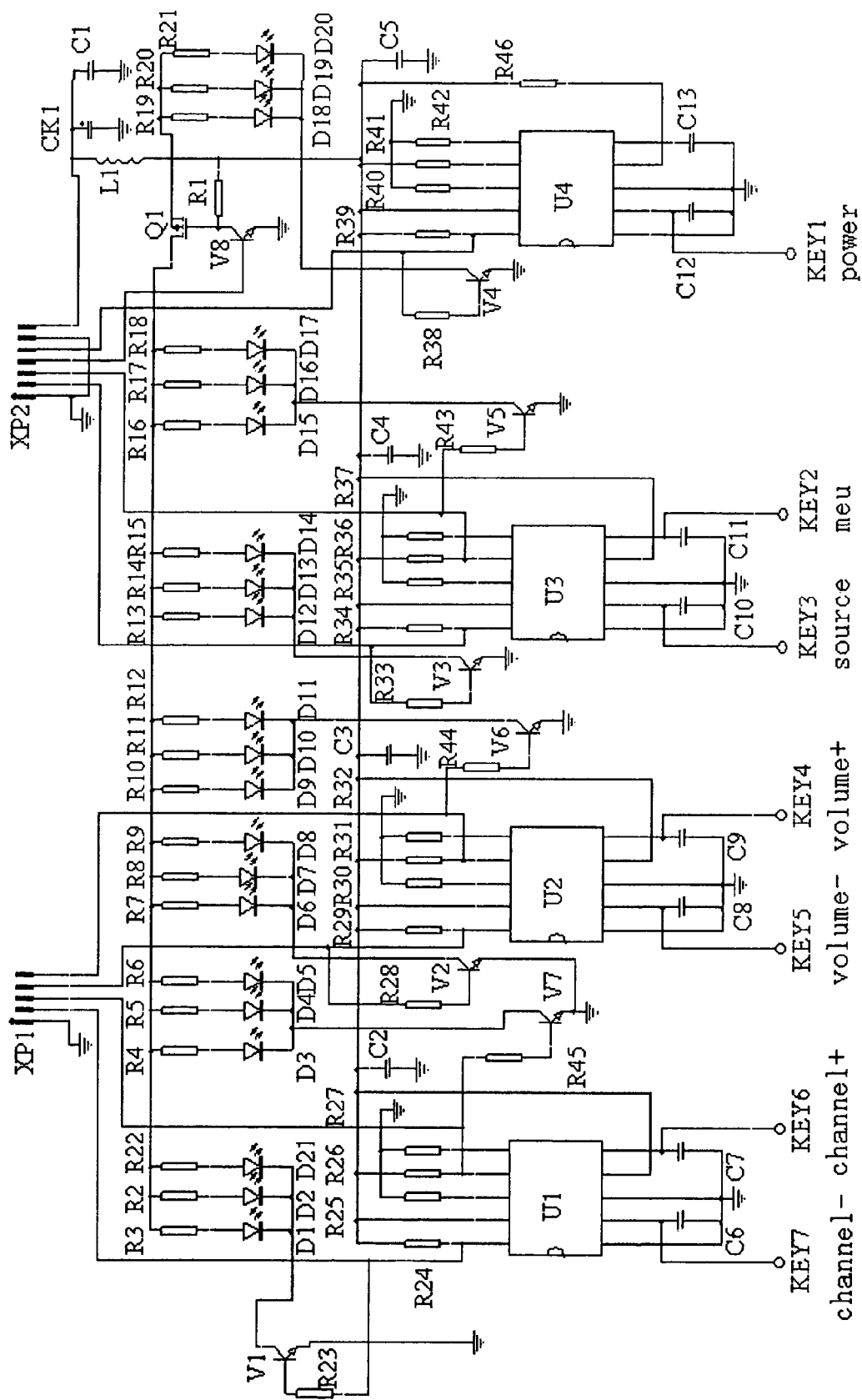
FIG. 4 is a circuit schematic diagram offered to implement the present invention.

When the LCD TV 1 is in working condition or non-working condition, as shown in FIG. 2, the position of the operation unit and whether it is located on the front of the TV can not be determined, only the power supply ON/OFF device 5 and the secondary indication unit 4 can be seen from the front of the TV, wherein the secondary indication unit 4 is an on-off indicator light and also the triggering unit used to trigger the primary indication unit. It is certain that the triggering unit can also be equipped with another triggering switch while not use the secondary indication unit 4. When the secondary indication unit 4 is electrically connected with the primary indication unit 7, as shown in FIG. 4, the primary indication unit 7 is six LEDs which emit blue light (see, FIG. 1). The mounting position of the primary indication unit 7 corresponds with the operation unit 3, and the operation unit 3 is six touching-type key-presses which respectively correspond with the menu key, the signal source key, the volume "+" key, the volume "−" key, channel "+" key and channel "−" key. With the operation unit 3, the pattern, volume and the channel of the TV can be adjusted.

When the power supply ON/OFF device 5 is connected, the secondary indication unit is illumined and the LCD TV 1 starts to work. The remote controller (not shown in the Figure) or the operation unit 3 in the LCD TV 1 can be used to operate the LCD TV 1 when it is desired. Since in most cases, the operation of the LCD TV 1 is performed by the remote controller, the use frequency of the operation unit is relatively low, and the visible operation unit will cause relatively large influence in the consumers if they watch TV for a long time at the visible position in the front of the TV.

Referring to FIG. 1, when the LCD TV 1 needs to be operated via the operation unit 3, the primary indication unit (not shown in the Figure) electrically connected with the secondary indication unit 4 is lightened by switching on the secondary indication unit 4, the primary indication unit lightens its vicinity, therefore the key-press sign silk-screen printed on the translucent shell 2 is illumined, which makes the operator can determine the position of the key-presses and distinguish the function of each key-press and makes the operation of the LCD TV 1 conveniently. The LCD TV 1 shown in FIG. 1 omits the positions of the power supply ON/OFF device 5 and the secondary indication unit 4 to intuitively embody the effect of the primary indication unit illumining the operation unit 3. Of course that the primary indication unit can also apply only a diode or similar indication device, such as laser generator, and the light omitted from the diode is blue or other color which is largely different from those of the operation unit 3 and the translucent shell 2. The translucent shell 2 is made of ABS, PC and color master batch, and its color is black. The color of the 6 key-presses is black or some other color relatively close to that of the translucent shell 2, and the translucent shell 2 is transparent. Therefore, after the diodes are illumined, the sign silk-screen printed on the translucent shell 2 can be lightened. The key-presses are located after of the translucent shell 2.

Since when the consumers want to operate the operation unit 3, the triggering unit needs to be triggered to control the working condition of the primary indication unit to show the position of the operation unit 3 and the function of each key. After a certain time interval (such as 10 seconds), the primary indication unit is automatically extinguished and the keys are again in the invisible status, which increases the interactive performance between the LCD TV 1 and the consumers.

The time interval here that the primary indication unit is illumined is fixed, which can be set as 10 s, 20 s or some other more appropriate time, and the time interval can be set through the circuit so that it can be adjusted by operating the operation unit 3 when it is desired.

Referring to FIG. 4, wherein KEY 1 is the power supply ON/OFF device 5, KEY 2, KEY 3, KEY 4, KEY 5, KEY 6 and KEY 7 are respectively the menu key, the signal source key, the volume "+" key, the volume "−" key, the channel "+" key and the channel "−" key, and they constitute the operation unit 3.

Operational principle is as below: the $7^{th}$ pin of the socket XP2 is KEY_STANDBY_POWER, which is the power supply +5 of the power supply ON/OFF device, and also the power supply of the chips U1, U2, U3, U4 and TS02. When the LCD TV 1 is in the normal working condition, the output from the $10^{th}$ pin of U4 is high level and V4 is properly conducted, and D18, D19 and D20 properly lightening.

When the user touches the power supply ON/OFF device, the output from the $10^{th}$ pin of U4 is instantaneously changed to low level and V4 is instantaneously non-conducted, D18, D19 and D20 are instantaneously extinguished. Meanwhile, the CPU of the LCD TV 1 set IO2 as high lever after it receives the low level signal of IO1, V8 is normally conducted, Vgs of Q1 is −5V, Q1 is conducted and D1-D17 LCDs are supplied with +5V, and the other six corresponding key-presses are illumined to irradiate. At the same time, after the CPU receives the low level signal of the IO1, it starts up the timer to time and the time is set by the user by the TV menu and generally is 10 s, 20 s, and so on. Here the user can see the silk-screen on the front of each key and all kinds of adjustments of the LCD TV 1 are performed according to the prompt of the silk-screen. When the timing reaches the predetermined time, the IO2 is set as low lever by the CPU, V8 is non-conducted, Vgs of the Q1 is 0V and Q1 is non-conducted. +5V is not supplied to the LCDs D1-D17, and correspondingly, the other six lights of the key-presses are extinguished.

The above description is the preferred embodiment of the present invention, yet the present invention is not limited to this. Any obviously change thought by those skilled in the art and some modifications and improvements without departure from the principle of the present invention should be fell in the scope of the present invention.

The invention claimed is:

1. A TV apparatus, which includes:
   a display unit configured to display an output content from said TV apparatus;
   an operation unit, including a plurality of touching-type key-presses and configured to operate said TV apparatus; and
   a primary indication unit configured such that when the primary indication unit is started up, the operation unit is in visible status, and when the primary indication unit is not started up, the operating unit is in invisible status;
   wherein, when the primary indication unit is not started up, the operating unit is in invisible status, such that when the TV apparatus is in a working condition, if the primary indication unit is not started up, the operation unit is in invisible status.

2. The TV apparatus of claim 1 further including:
   a secondary indication unit configured to indicate the working condition of the TV apparatus; and
   a triggering unit, configured such that when triggered, starts up said primary indication unit, wherein
   said secondary indication unit is the triggering unit.

3. The TV apparatus of claim 2, wherein said secondary indication unit is configured to be used as the triggering unit to control the condition of said primary indication unit when a power source of the TV apparatus is in working condition.

4. The TV apparatus of claim 1, wherein:
   said primary indication unit is an LED,
   said LED is fixedly connected with said display unit.

5. The TV apparatus of claim 4, wherein:
   said LED includes plural LEDs,
   a number of said LEDs is the same as that of said touching-type key-presses, and
   mounting positions of said LEDs correspond to those of said touching-type key-presses.

6. The TV apparatus of claim 1, wherein said display unit is equipped with a translucent shell, and a color of said operation unit is similar to or the same as said translucent shell.

7. The TV apparatus of claim 6, wherein:
   said operation unit is located behind said translucent shell, and
   said operation unit is fixedly connected to said display unit.

8. The TV apparatus of claim 6, wherein the light emitted from said primary indication unit is different from the color of the translucent shell.

9. The TV apparatus of claim 6, wherein both the translucent shell and the operation unit are black and light from the primary indication unit is blue.

10. The TV apparatus of claim 1, wherein the indication time of said primary indication unit is determined each time.

11. An operation method of a TV apparatus, wherein said TV apparatus includes:
    a display unit configured to display an output content from said TV apparatus;
    an operation unit, including a plurality of touching-type key-presses and configured to operate said TV apparatus; and
    a primary indication unit,
    the method including steps of:
    starting up the primary indication unit, such that said operation unit is in visible status and said operating unit can then be operated; and
    when the primary indication unit is not started up, said operating unit is in invisible status.

* * * * *